US008942090B2

(12) United States Patent
Nakash

(10) Patent No.: US 8,942,090 B2
(45) Date of Patent: Jan. 27, 2015

(54) TECHNIQUE FOR THROUGHPUT CONTROL FOR PACKET SWITCHES

(75) Inventor: Shell Nakash, Kfar-Sava (IL)

(73) Assignee: ECI Telecom Ltd., Petach-Tikva (IL)

( * ) Notice: Subject to any disclaimer, the term of this patent is extended or adjusted under 35 U.S.C. 154(b) by 117 days.

(21) Appl. No.: 13/504,252

(22) PCT Filed: Oct. 12, 2010

(86) PCT No.: PCT/IL2010/000826
§ 371 (c)(1),
(2), (4) Date: Apr. 26, 2012

(87) PCT Pub. No.: WO2011/051929
PCT Pub. Date: May 5, 2011

(65) Prior Publication Data
US 2012/0224480 A1    Sep. 6, 2012

(30) Foreign Application Priority Data

Oct. 27, 2009 (IL) .......................................... 201774

(51) Int. Cl.
*H04L 12/56* (2006.01)
*H04L 12/801* (2013.01)
*H04L 12/833* (2013.01)
*H04L 12/823* (2013.01)
*H04L 12/935* (2013.01)

(52) U.S. Cl.
CPC ............... *H04L 47/10* (2013.01); *H04L 47/12* (2013.01); *H04L 47/31* (2013.01); *H04L 47/32* (2013.01); *H04L 47/326* (2013.01); *H04L 49/3018* (2013.01)

USPC .......................................................... 370/230

(58) Field of Classification Search
CPC ............................... H04L 47/00; H04L 47/10
USPC .................................................. 370/228–236
See application file for complete search history.

(56) References Cited

U.S. PATENT DOCUMENTS

| 5,557,608 A | * | 9/1996 | Calvignac et al. ............ 370/389 |
| 5,742,606 A | * | 4/1998 | Iliadis et al. .................. 370/413 |
| 5,790,522 A | * | 8/1998 | Fichou et al. ................. 370/236 |

(Continued)

OTHER PUBLICATIONS

Bernet et al., An Informal Management Model for Diffserv Routers, "draft-ietf-diffserv-model-06.txt", IETF Standard-Working-Draft, Internet Engineering Task Force, IETF, CH, vol. diffserv, No. 6, Feb. 1, 2001, pp. 1-56.

(Continued)

*Primary Examiner* — Nicholas Jensen
*Assistant Examiner* — Berhanu Belete
(74) *Attorney, Agent, or Firm* — Novick, Kim & Lee, PLLC; Harold L. Novick; Jae Youn Kim

(57) ABSTRACT

A method for selective admission of traffic packets to a telecommunication switch having a limited throughput T and a common input queue, wherein the traffic packets comprise packets pre-assigned to higher and lower classes; in case of congestion at the common input queue of the switch, the method performs selective admission of the packets to the switch according to classes pre-assigned to them and depending on dynamic, recently utilized throughput of the switch.

10 Claims, 3 Drawing Sheets

(56) References Cited

U.S. PATENT DOCUMENTS

| | | | |
|---|---|---|---|
| 6,657,962 | B1 | 12/2003 | Barri et al. |
| 6,907,001 | B1 * | 6/2005 | Nakayama et al. ............ 370/230 |
| 7,016,366 | B2 * | 3/2006 | Kawarai et al. ............... 370/413 |
| 7,149,291 | B1 * | 12/2006 | Deshpande ............... 379/112.01 |
| 7,653,069 | B2 * | 1/2010 | Lakshmanamurthy et al. ........................... 370/395.4 |
| 8,085,800 | B2 * | 12/2011 | Naven et al. .................. 370/412 |
| 8,149,708 | B2 * | 4/2012 | Oz et al. ........................ 370/235 |
| 2004/0213265 | A1 | 10/2004 | Oueslati et al. |
| 2004/0223452 | A1 * | 11/2004 | Santos et al. ................... 370/229 |
| 2005/0025052 | A1 * | 2/2005 | Zhao et al. ..................... 370/230 |
| 2008/0183825 | A1 * | 7/2008 | Alicherry et al. ............. 709/206 |
| 2008/0291935 | A1 | 11/2008 | Campion et al. |
| 2009/0086747 | A1 * | 4/2009 | Naven et al. .................. 370/412 |
| 2009/0323532 | A1 * | 12/2009 | Lai ................................ 370/235 |

OTHER PUBLICATIONS

Suri et al., "A comparative evaluation of space priority strategies in ATM networks", INFOCOM '94. Networking for Global Communications., 13th Proceedings IEEE Toronto, Ont., Jun. 12, 1994, pp. 516-523.

Kim et al., "Distributed admission control via Dual-Queue Management", in Vehicular Technology Conference, 2003. VTC 2003-Fall. 2003 IEEE 58$^{th}$, pp. 1-5.

Park et al., "A High Throughput Packet-Switching Network with Neural Network Controlled Bypass Queueing and Multiplexing" (Parallel Processing, 1994. ICPP 1994. International Conference, vol. 1, Issue, Aug. 15-19, 1994, pp. 9-12.

International Search Report mailed Mar. 4, 2011, International Application PCT/IL2010/000826, filed Oct. 12, 2010.

Written Opinion for PCT/IL2010/000826 mailed Mar. 4, 2011.

\* cited by examiner

TECHNIQUE FOR THROUGHPUT CONTROL FOR PACKET SWITCHES

CROSS-REFERENCE TO RELATED APPLICATIONS

This Application is the National Phase of International Patent Application No. PCT/IL2010/000826 filed Oct. 12, 2010 and designating the United States, which claims priority to Israel Patent Application No. IL 201774, filed Oct. 27, 2009.

FIELD OF THE INVENTION

The present invention relates to the field of packet-switched networks and more particularly, is directed to a method and apparatus for class-based adaptive throughput control in a packet switch.

BACKGROUND OF THE INVENTION

Packet switches (hereafter, also switches) transfer packets from their inputs to the specified outputs. A packet switch would become congested when the input traffic exceeds the capacity it can serve, the latter being referred to as switch throughput and is usually expressed in packet per seconds (pps).

Typical scenarios include: (1) Switches with physical interfaces (a.k.a., ports) that together provide a larger capacity than what the internal switching hardware (HW) supports, regardless of packet size. For example, a vendor may offer a switch card with 4 ports of 10 Gbps (total of 40 Gbps) while its throughput is only 20 Gbps. This may be acceptable by customers who assume that it is rare that the switch would face traffic arriving at wire speed simultaneously from all ports (2) Switches with packet-dependent throughput, where the switch would become congested upon large bursts of short packets (e.g., packet size of 64 bytes). For example, a switch may possess an interface capacity of 40 Gbps, and would easily handle a 40 Gbps input of large packets (e.g., packet size of 1500 bytes), but would become congested upon 40 Gbps input of 64-byte packets. This fact indicates that resources of the switch are mostly spent for processing packet headers (that are similar for all packets), and much less for processing their payload.

Congestion at input would typically be detected by a small queue (a.k.a., ingress buffer) that is shared by all the input traffic, and its packets are processed one at a time at their respective arrival order, in a first in first out (FIFO) fashion. In the event of congestion at input, the ingress buffer would overflow and the switch would start discarding any further packets, until a room is again available at the ingress buffer. These discards are made randomly, meaning regardless of whether a packet belongs to a low or high importance service.

Discarding packets randomly is generally disfavored. It ignores the today's trend to differentiate between services that service provider use to offer to their customers. This differentiation is achieved by associating quality of service (QoS) per service. A high QoS service would normally cost more than a low QoS service, due to the additional resources allocated to maintain its elevated quality. Typical examples for high QoS traffic are voice over IP (VoIP) and video, while low QoS traffic could be high-speed Internet (HSI). HSI uses reliable delivery protocols such as TCP, and would regenerate packets if lost or discarded. In comparison, VoIP and video are delay-sensitive real-time protocol which do not regenerate packets, and therefore high delays and packet lost could seriously degrade a phone conversation or a video movie.

Dongsook Kim et al. "Distibuted Admission Control via Dual-Queue Management" describes a queue management framework via the use of connection level information already embedded in existing data traffic. To improve the system performance and resource utilization at times of intense network congestion, data packets and connection establishment packets are queued separately. Different queuing and dropping policies can then be applied to them, thus the term "dual queue management" is used.

The approach described in the paper requires sorting the traffic at the input into two traffic flows (data packets and connection establishment packets), and consequent different packet processing for each flow in case of congestion. This solution disregards packet QoS, and queues packets based on whether they belong to established connections or not. Most importantly, it requires two separate queues at the input and an entity that would process packets (i.e., find out whether they belong to established connections) before it queues them in one of the two queues. This pre-queuing processing entity is typically not available in switches, particularly not in off-the-shelf programmable switches (a.k.a., Network Processors).

Young-Keun Park et al. "A High Throughput Packet-Switching Network with Neural Network Controlled Bypass Queueing and Multiplexing" (Parallel Processing, 1994. ICPP 1994. International Conference, Volume 1, Issue, 15-19 Aug. 1994 Page(s):9-12. Digital Object Identifier 10.1109/ICPP.1994.31) proposes a high throughput packet switching network with bypass queues based on a MN. The switch throughput is improved by partitioning the input buffers into disjoint buffer sets and multiplexing several sets of non-blocking packets within a time slot. A neural network model is presented as a controller for packet scheduling and multiplexing in the switch.

Like the previous reference, the solution also partitions the input traffic to separate queues and requires a pre-queuing processing entity.

US2004213265A relates to a device for processing packets of flows on a network link, the device including scheduling means for scheduling packets in a queue in accordance with a fair queuing with priority algorithm. The admission control requires pre-processing on each arriving packet, and if it passes it is queued in a FIFO queue. It then analyzes state of the FIFO queue and makes scheduling decisions based on the state. Admission control also can reject an already queued packet upon arrival of another. Like the previous references, this method requires a pre-queuing processing entity. The rejection of queued packets requires special implementation that is generally not available in off-the-shelf switches.

US US2008291935A describes a system for selectively discarding packets in a network device. The method includes receiving an upstream bandwidth saturation indicator for a queue in the network device, and identifying one or more codecs employed in packets in the queue when the upstream bandwidth saturation indicator indicates saturation. The method further includes determining a packet discarding policy based on the one or more codecs, and discarding packets in accordance with the packet discarding policy. However, it is just a finer grade of discarding at the output queue. The saturation condition occurs not because of limited packet processing power of the switch but because of congestion at the output queue (upstream BW).

To the best of the Applicant's knowledge, neither of the prior art references efficiently solves the problem of handling traffic congestion at the input of a telecommunication switch without the use of pre-queuing processing entity. In other words, there is no efficient and judicious technique of discarding packets from a common input queue (comprising non-differentiated, all incoming packets) of a switch having a limited throughput and experiencing congestion at the input.

OBJECT AND SUMMARY OF THE INVENTION

It is therefore an object of the invention that a telecommunication packet switch having a limited throughput and experiencing congestion at its input, would be able to selectively and judiciously discard traffic packets from a common input queue (i.e., the input queue comprising non-differentiated, all incoming packets).

The Inventor proposes a novel method to achieve the above object. Generally, it is proposed to a) perform such a packet discard before inputting to the switch, depending on classes assigned to traffic packets, say, on quality of service (QoS) b) by taking into account dynamic, currently available throughput of the switch. The Inventor further proposes measures allowing to achieve the object in a manner minimizing waste of the switch resources for processing those packets which will not have chance for being transmitted out the switch, i.e. by discarding suitable packets almost directly upon outputting from the input queue.

At the minimum, the telecommunication packet switch should comprise an input queue, processing resources of the switch and admission control means positioned there-between and adapted to distinguish at least between two classes (two QoS levels), hereafter referred to as low vs. high class packets. According to the proposed approach, when congestion occurs at the input queue (i.e., is detected there), the switch, using its admission control means, would preferably discard low class packets, depending on the recent (instantaneous) usage of switch throughput by high class packets.

The proposed method (algorithm) does not need to order discard of a high class packet, only low class packets. However, high class packets may be discarded by the switch/queue hardware (not algorithm) when the input queue overflows and has no room for more packets, as would occur when incoming high class traffic rate is persistently larger than T. The state of congestion may be determined by one or more predetermined thresholds of the queue fill level, these thresholds are lower than the maximum fill level which is the overflow threshold.

DEFINITIONS

A switch with no congestion at its input queue is hereafter considered to work in a Normal state, while a switch that is under congestion at its input queue is hereafter considered to work in a Stress state.

Given a switch throughput T packets per second (pps), our target could be formulated as follows: The switch should fully admit high class packets (naturally, up to a limit T). In case the instantaneous rate H pps of high class packets recently admitted by the switch is below T, the switch should ideally be able to admit low class packets at rate $L=T-H$. For example, a switch with throughput T=30 million pps (30 Mpps) admitting high class packets at rate H=10 Mpps, would ideally be able to admit low class packets at rate L=20 Mpps.

For more accuracy, T may be replaced with $T'=T-PD$, where $T' \leq T$ is a predefined limit of the throughput T, P is the Interface Capacity of the switch, while D is a relative proportion of processing power of the switch required to discard a lower class packet. The expression T−PD is suggestive, yet what is important is to be able to choose a value T' that is smaller than T and reflects resources wasted for discarding lower class packets.

The recently utilized throughput of the switch is dynamic, it depends on rate of high class packets recently admitted to the switch.

The expression "instantaneous rate of high class packets recently admitted . . . " should be understood as dynamic rate of admitted high class packets.

Admission should be understood, in the context of this description, as transferring of packets from the input queue to the next processing blocks of the switch. This does not assure that packet will actually be transmitted to an outgoing port, as next blocks might decide to discard it for other reasons. Similarly, discarding in the context of this description refers to discarding a packet directly upon outputting from the input queue, that is, before entering the next processing blocks of the switch. Discarding occurs due to congestion at the ingress buffer (input queue) which is assumed to be shared by all incoming packets, subject to recently utilized switch throughput by high class packets.

According to the first aspect of the invention, there is proposed a method of selective admission of traffic packets to a telecommunication switch having a limited throughput T and a common input queue, wherein the traffic packets comprise packets pre-assigned to higher and lower classes;

in case of congestion at the common input queue of the switch, the method performs selective admission of the packets to the switch according to classes pre-assigned to them and depending on recently utilized throughput of the switch. Given the definitions above, this adaptive throughput-control algorithm can be further summarized as follows (reference can be made to FIG. 1):

Rule 1: When in the Normal state, a switch shall equally admit low and high class packets. Thus, it shall not discriminate between high and low class packets at the input.

Rule 2: When in the Stress state, a switch shall admit all high class packets queued at the input queue, and shall admit low class packets up to a rate of low class packets $L=T-H$.

The amount T−H could be measured by packet metering means, such as a so-called policer. The rate of low class packets L is by default the leftovers of the throughput T, i.e., their admission is not guaranteed. However, it is possible to set a pre-established quote L' for low class packets, in which case L would consist of both guaranteed (L') and non-guaranteed (T−H) portions. (For example L' may be equal to 0.1 T). When L<L', the low class packets should be admitted. If not, the current leftovers will be used to determine whether the low class packet is to be admitted.

In other words, when the traffic packets comprise packets of two classes being High class and Low class, the method may comprise continuous performing of the following operations:

queuing all said traffic packets, regardless of their classes, into the common input queue;

determining whether the queue is in its Normal state or in its Stress state characterizing the congestion;

processing the queued packets one at a time at their respective arrival order (FIFO fashion), the processing comprising:

determining class of a specific packet to be next outputted from the queue;

determining instantaneous leftover throughput $L=T-H$, where H is rate of High class packets recently admitted from the queue;

if the queue is in the Normal state, admitting the specific packet regardless of its class;

if the queue is in the Stress state, admitting said specific packet if being of the High class; while if said specific packet is of the Low class, admitting it only when T−H>0, otherwise discarding said specific packet.

According to a second aspect of the invention, there is provided a telecommunication switch assembly capable of performing the above-described method. The switch assembly comprises an input queue and basic packet processing blocks of throughout T, a block that determines packet class, means to determine fill level of input queue and packet metering means (e.g., policer) to determine the recently used throughput of the switch (or, more specifically, to determine leftover of switch throughput T−H). The block for determining the packet class, together with the packet metering, and the accompanying rules form a so-called admission control means.

According to a further aspect of the invention, there is proposed a software product comprising computer implementable instructions and/or data for carrying out the method, stored on an appropriate computer readable storage medium (say, on a hardware card or disc forming part of the admission control means, being in its turn part of the switch controller) so that the software is capable of enabling operations of said method when used in the switch controller. The software product is preferably embedded in a hardware (programmable hardware) device as it should be able to handle each packet arriving at very high speeds.

The invention will be described in detail as the description proceeds.

BRIEF DESCRIPTION OF THE DRAWINGS

The invention will be further described with reference to the following non-limiting drawings in which.

DETAILED DESCRIPTION OF THE INVENTION

Figure 1:
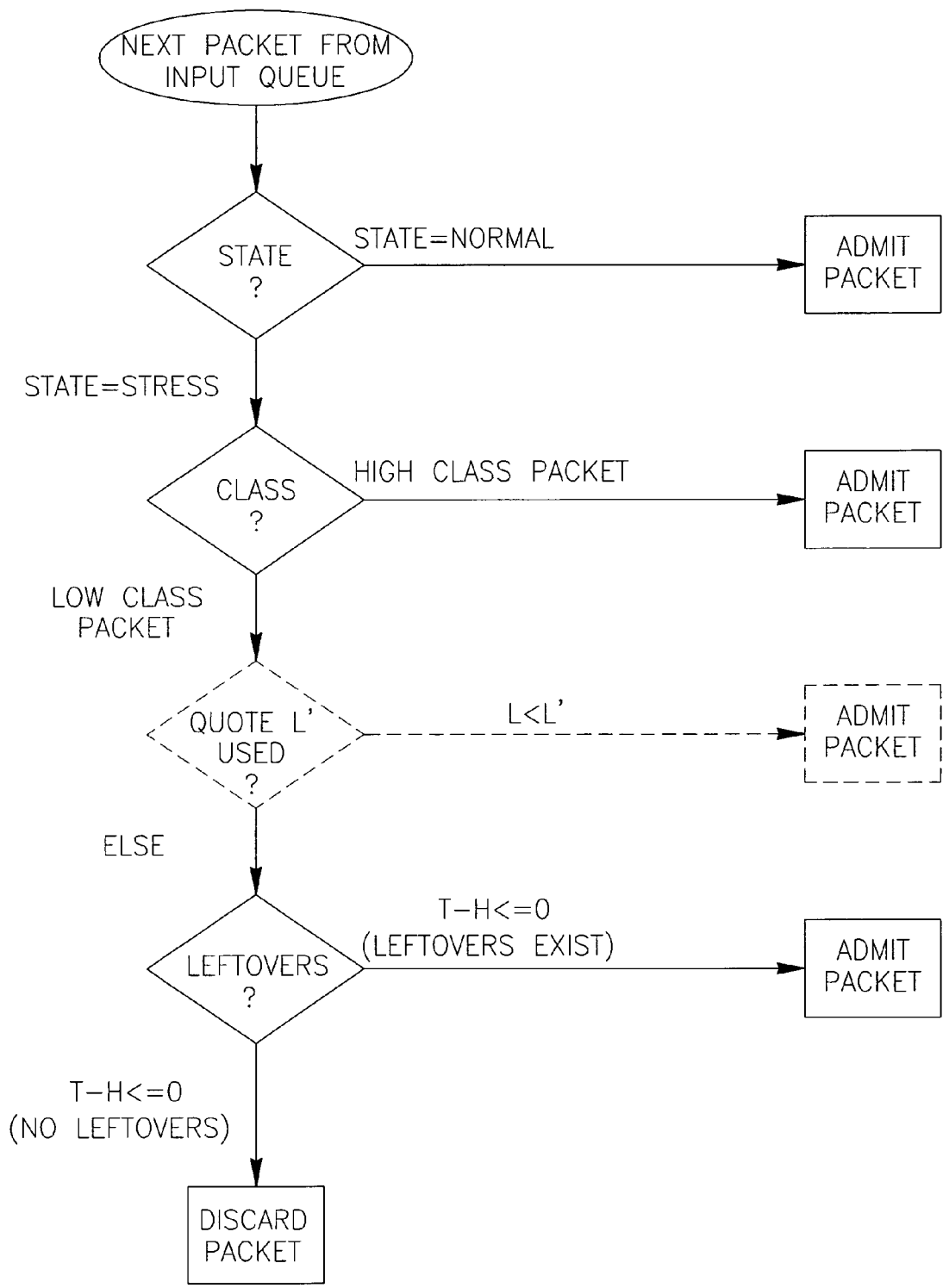
FIG. 1 shows a basic flow chart of the algorithm for the proposed admission control method in a communication switch with limited throughput.

FIG. 1 illustrates a basic version of the algorithm proposed by the Inventor.

Figure 3:
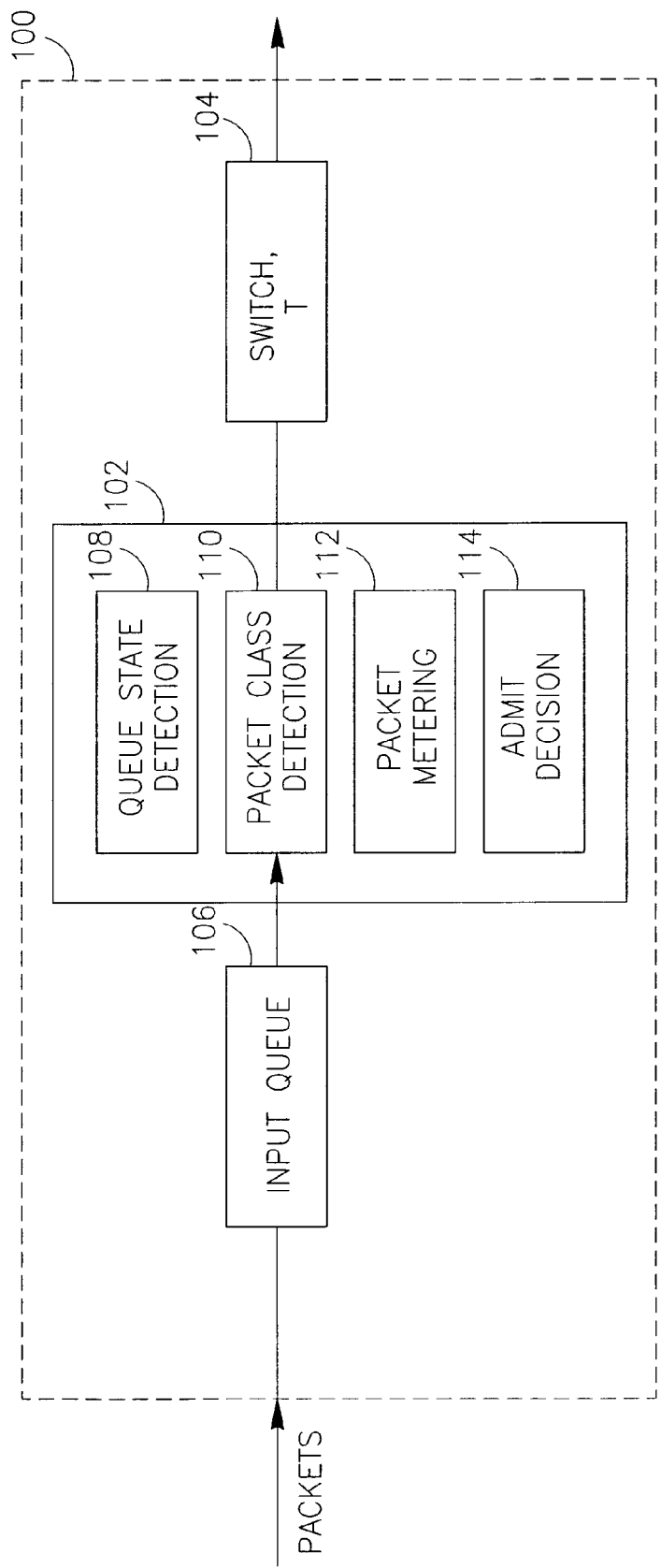
FIG. 3 schematically illustrates the proposed switch with the controlled packet admission.

The algorithm of FIG. 1 should be considered with reference to FIG. 3 which shows main blocks of the proposed switch assembly 100 provided with the inventive block 102 of admission control. The inventive block is positioned between the basic packet processing blocks 104 and its input queue 106 serving as a common FIFO for ingress packets of all classes and sending both traffic and fill level indications to block 102. The Admission control block 102 comprises at least four sub-blocks: a Packet Class determiner block 110 for determining class of the packet leaving the Queue 106, state detector block 108 which is responsible for determining state (Normal or Stress) of the queue 106, a Packet Metering block 112 which measures the leftover throughout T−H, and block 114 which executes the algorithm and provides a decision of whether a packet should be admitted or rather be discarded. Block 112 may be implemented by a policer. It should be noted that multiple policers can be embedded in block 102, if the algorithm is enhanced to account for more than two classes.

In FIG. 1, the main boxes of the flow chart are clearly indicated and do not require reference numerals. As has been mentioned in the Summary, the Inventor proposes two main Rules:

Rule 1: When in the Normal state, a switch shall equally admit low and high class packets.

Rule 2: When in the Stress state, a switch shall admit all high class packets queued at the input queue, and shall admit low class packets up to a rate of low class packets L=T−H (where T is the switch throughput and H is rate of admitted high class packets).

The above algorithm is adaptive in the sense that it is applied dynamically on each packet arriving from the input queue. Hence, the switch may discard one packet and then admit a subsequent packet, and vice versa.

Unlike the prior art solutions, one input queue is sufficient. Moreover, there is no pre-queuing processing entity, since the algorithm of FIG. 1. is applied on already queued packets, i.e. after the packets are queued.

The proposed algorithm is optimal for packet switches having one common input queue. However, in case an existing packet switch comprises more than one input queue and performs sorting of the packets there-between by classes, our proposed algorithm can be utilized also with such a switch. In this case, the admission control means may be exempted from determining class of packets if they are taken from the respective queues, and instead of discarding low class packets, they would just be kept stored in their own queue.

Rule 2 gives high class packets a strict preference over low class packets when they compete for the processing resources, leaving the low class traffic only the "leftovers" that are instantaneously not demanded by the high class traffic. At the extreme, when the switch receives high rates (larger than T) of both high and low class packets or at least of high class packets, it would be admitting only high class packets while discarding all the low class packets, unlike the traditional random discard of both high and low class packets.

Discarding the low class packets per Rule 2 rather than fully processing and admitting them, would save processing resources which can then be shifted to admit high class packets. Yet, in real life the switch still needs to do some processing on a packet before it can discard it (e.g. to identify it as low class). To accommodate this situation, the throughput T in FIG. 1 may be replaced by T'=T−PD (not shown), where P is the Interface Capacity of the switch, i.e. the maximum capacity that can arrive from outside world (network) to the input queue, while D is the ratio of the processing power required to discard rather than admit a low class packet. It is equivalent to say that the hypothetical discard rate of low class packet is T/D, had the switch enough interface capacity to accept such traffic rate. A value of, say, D=0.1, means that the processing effort to discard a low class packet at the input is 10% the effort required to admit it, and the discard rate of low class packets is then 10 T. Therefore, the value T' may be predetermined.

As an example, a switch with throughput T=30 Mpps, P=60 Mpps, D=0.1 receiving 30 Mpps of high class packets and 30 Mpps of low class packets from the network, would be discarding all low class packets and admitting 30−60×0.1=24 Mpps of high class packets, compared to the ideal admission rate of 30 Mpps. This is usually sufficient because normally high class packets consist a small portion of the traffic (e.g., 6 Mpps in the example above).

The lower is D, the more resources are saved per discard of low class packet, for treatment of high class packets. When PD approaches the ideal value 0 then T' becomes approximately T, which means that high class packets can always obtain the complete throughput T.

Since our proposed technique allows discarding low class packets at the very entrance of the switch, without admitting them to major processing blocks in the switch, it is especially advantageous for modern complex telecommunication switches equipped with advanced and resource-consuming features. For such switches, D would a priori be low.

Rule 2 may not be simplified by the following sub-optimal Rule 2': "When the switch is in Stress state, it shall discard all arriving low class packets". That is, whether to admit or discard a low class packet is determined solely by the fill level of the input queue. This Rule 2' is sub-optimal because discarding a low class packet still consumes resources (i.e., D>0). This is exemplified by the next scenario: Suppose that the input consists of only low class packets, at a rate 3 T, while D=0.3. Accordingly, the switch would become congested most of the time, i.e. working in Stress state. Applying Rule 2', the switch would be busy discarding most low class packets. Specifically, the admitted packet rate would be T−MD where M is the low class rate arriving to the input queue. In this example T−MD=T−3 T×0.3=0.1 T, i.e. only 10% of the packets would be admitted. The Rule 2' is thus sub-optimal because it can lead to underutilization of the switch resources in some scenarios. In comparison, using rule 2 all the low class packets would be admitted since no high class packets are present (H=0), that is, T'−H>0 in FIG. 1.

Other Possible Variations of the Method:
VAR 1: Rule 2 may be modified to guarantee some processing resources to low class packets, rather than providing to them only leftovers. In FIG. 1, the dashed boxes represent reservation L' (say, 10% of switch throughput L'=0.1 T) for low class packets; other percentages could also be used.

VAR 2: Multi-class case may be supported, with more than two packet classes (e.g., lowest class 0 to highest class 7). In this case the Rule 2 could be modified as follows: "When in the Stress state, a switch shall admit a packet of a given class n (e.g, n=4) up to a rate of $L_n$=T−Sum($L_i$, 1 to n+1)=L1−L2−...−Ln+1, where Ln is the recent throughput usage by class n (e.g., L4=T−L7−L6−L5). Again, T should be replaced by T' for real life situations.

VAR 3: Rule 2 may also be modified to discard low class packets in a so-called random early discard (RED) fashion rather than the widely used tail-drop discards, thereby allowing better usage of switch throughput resources in case the low class packets carry the TCP protocol.

VAR 4: Other packet types can be created. For example, high class AND high precedence packets could be used instead of all high class packets, where high precedence packets are packets arrived with high precedence mark, thereby offering further filtering among high class packets.

Examples of Implementing the Algorithm.

The effectiveness of the throughput-control algorithm can be demonstrated by multiple scenarios, given a switch throughout T. For convenience D would be assumed negligible (i.e., D=0):

Scenario 1
0.8 T low class packets and 0.1 T high class packets arrive at switch input. Since the total input 0.9 T does not exceed the throughput T of the switch, the switch operates in Normal state (Rule 1), where it admits all packets (zero discards).

Scenario 2
N>T low class packets arrive to the input queue of the switch. Since N is larger than the throughput T, the switch is continuously in the Stress state (Rule 2), and since only low class packets arrive (H=0), it would admit low class packets at rate L=T−H=T. Therefore, in the absence of high class packets the switch can fully utilize its throughput resources to admit low class packets.

Scenario 3
N>T high class packets arrive at switch input. Since N is larger than the throughput T of the switch, the switch would admit high class packets at rate T. Note that the switch is continuously in Stress state (Rule 2), however Rule 2 does not impact the admission of high class packets. Therefore, the switch admits the high class packets up to its throughput T.

Scenario 4
N≥T low class packets and N≥T high class packets arrive at switch input. Since the total input N is larger than the throughput T of the switch, the switch is continuously in Stress state (Rule 2). Further, the switch would only admit high class packets at rate H=T, and would discard all low class packets (L=T−H=0). Therefore, the switch admits the high class packets up to its throughput T, which leaves zero resources for low class packets.

Scenario 5
1.2 T low class packets and 0.3 T high class packets arrive at switch input. Since the total input 1.5 T is larger than the throughput T of the switch, the switch is continuously in Stress state (Rule 2). Further, the switch would admit all high class packets at rate H=0.3 T, and would admit low class packets at rate L=T−0.3 T=0.7 T. Therefore, the switch admits all the high class packets, and uses the leftover resources (0.7 T) to admit low class packets. Note that the proposed method (algorithm) never orders to discard a high class packet, only low class packets. However, high class packets may be discarded by the switch/queue hardware (not algorithm) when the input queue overflows and has no room for more packets, as would occur when incoming high class traffic rate is persistently larger than T.

Realization Considerations

Figure 2:
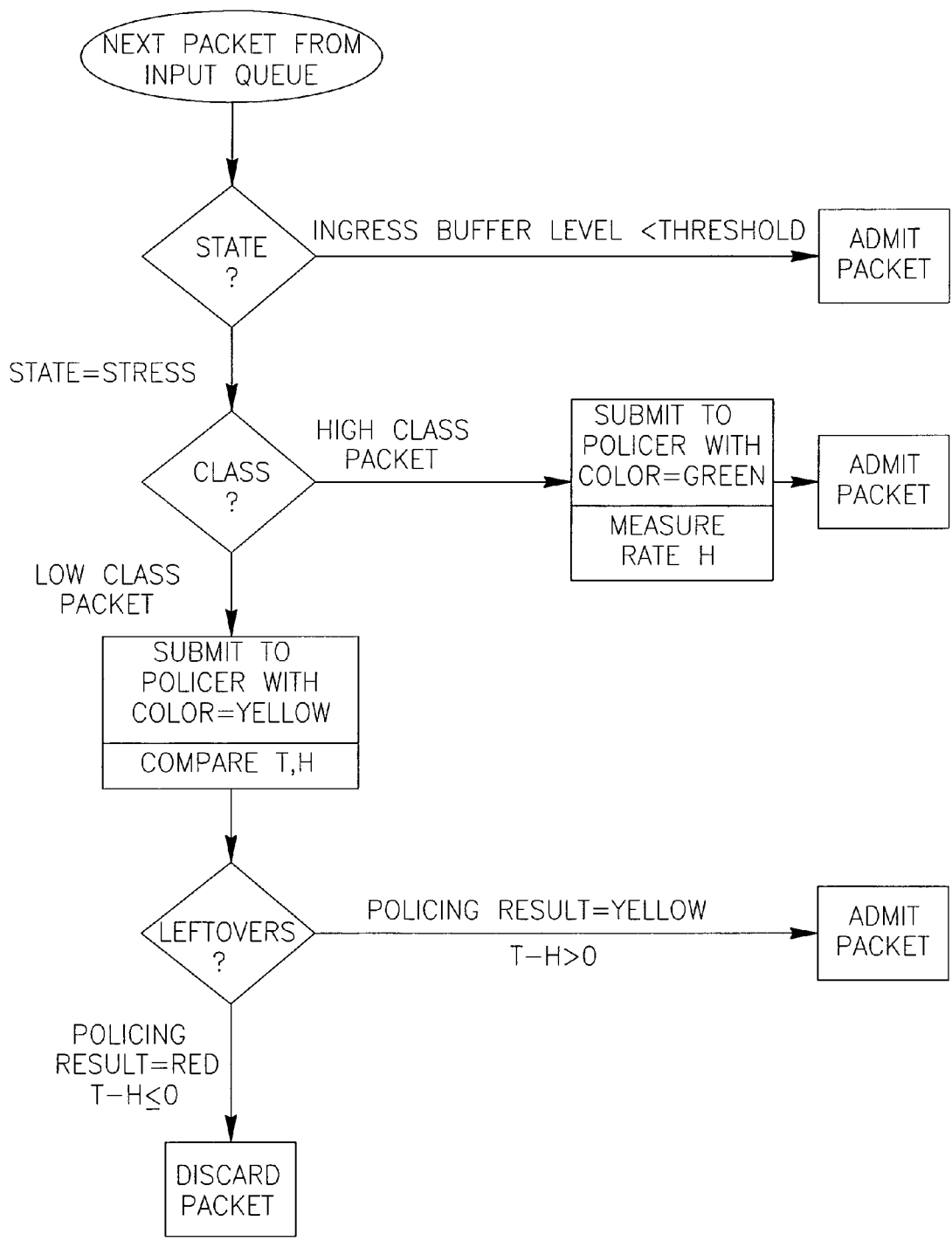
FIG. 2 shows an example of implementing the basic algorithm by utilizing a policer.

This section forms an integral part of the invention, and is meant to present practical ways for implementing the invention, which are further summarized by FIG. 2.

Congestion State

The congestion state could be detected when the fill level of the ingress buffer crosses upwards a predefined threshold (marked ThON), and would be cancelled when that fill level crosses downwards another, yet smaller, predefined threshold (marked ThOFF). Thus, the switch is initially in Normal state and would enter Stress state when fill level crosses ThON upwards, and would return back to Normal state when fill level ThOFF is crossed downwards.

The fill level ThON can be used to dynamically detect congestion because when the switch packet processing rate lags behind the incoming traffic rate, the packets would start accumulating at the ingress buffer. The ThOFF being smaller than ThON can be used to avoid too frequent declaration and release of Stress state, this effect is so-called hysteresis. At the particular case of ThON=ThOFF there is actually one threshold (no hysteresis), this could be used to simplify implementation.

As described earlier, other combinations are possible:
VAR 3: RED can be implemented by splitting a fill level threshold ThON to two thresholds, ThON1 and ThON2. When fill level is above ThON2, the switch is always (probability 1) at the Stress state. When fill level is above ThON1 but below ThON2, the switch is at Stress state with probability P depending on how close the fill level is to ThON2. For example, P=0.1 means Stress state will be declared at average for one out of 10 low class packets.

Discard/Admit Decision Point

As described earlier, a switch still needs to perform some actions on packets that are eventually discarded, primarily the identification a packet as low or high class. Unlike the congestion state, which is relatively easy determined by the hardware assistance (reading buffer fill level), identifying the packet class would usually require a search in lookup tables, these lookups are main causes for throughput bottlenecks.

It is preferable that the aforementioned actions would be a portion of the normal "processing chain" of a packet, i.e. the set of actions made on a packet once it arrives till it leaves the switch. This is usually possible, because the switch anyway needs to determine packet's class for purposes other than the throughput control, e.g., for differentiated treatment at the outgoing port.

Thus, for admitted packets the switch would apply the full processing chain, while for discarded packets the switch would immaturely halt at a relatively initial break point of the processing chain. The closer the break point to the origin of the processing chain, the smaller is the amount of resources consumed by packets prone to discard. This effort is represented by the factor D discussed earlier, where a closer break point means smaller D.

Rate Monitoring

According to Rule 2 and FIG. 1, a switch in stress mode should admit low class packets only if there are no high class packets in need, i.e., low class packets would enjoy only leftovers of the processing resources. To implement this scheme, the switch must do some measurements of the admitted traffic rates.

We now turn to FIG. 2 illustrating one possible implementation of the proposed selective admission algorithm.

Since the ingress buffer contains unidentified packets the switch doesn't know which of them are high class and thus cannot use this buffer to measure the high class packet rate. Instead, the switch may apply a policer for this purpose. a policer is a software or hardware object that can measure packet rates and compare them against predefined threshold(s). Policers are commonly implemented by switches that support QoS, so wherever a differentiation between low and high class traffic (i.e., applying a sort of minimal QoS) is required, policers would naturally be available.

This scheme is achievable using a so-called color-aware bandwidth profile algorithm as per Metro Ethernet Forum (MEF) specification 5, hereafter called MEF policer. While MEF policer was originally intended to differentiate between so-called packet colors (Green, Yellow) with which a packet arrives, packet color is hereby used to represent packet class, wherein Green (Yellow) color would represent a high (low) class packet, respectively. Another modification is to measure guaranteed and excess rates (CIR, EIR) in [pps/8] rather than [bits per second], and to measure guaranteed and excess burst sizes (CBS, EBS) in [packets] rather than [bytes], wherein packet lengths submitted to the policer would always be 1.

Given a switch capacity T, the MEF policer would be configured as follows: (1) Color Mode, CM=color-aware (2) Coupling Flag, CF=1 (3) CIR=T (4) EIR=0 (5) CBS=EBS. It should be noted that better values may be used; they could be derived by tuning the policer for best results. In particular, CIR should be set to T' rather than to T to accommodate the real life situation of D>0.

This configuration of the policer would be interpreted as follows: (1) CM=color-aware enables the use of two packet types, namely, high and low class traffic (1) CIR=T and CBS=1 together guarantee the switch throughput T to the high class packets (2) EIR=0 guarantees no processing resources to low class packets (3) CF=1 and EBS=1 together offer low class packets the leftovers that are not utilized by high class packets, for up to the full throughput capacity T.

With these in mind and is visualized by FIG. 2, the switch would submit to the policer any packet arriving at the input. The result issued by the policer would be processed as follows: (1) If the packet is of high class, the packet is admitted. Note that there is no usage to policer result here, since high class packets are submitted to the policer just to measure their rates (2) Else if the packet is of low class AND policer result=Yellow, then consider this as T−H>0 in FIG. 2 and admit the packet (3) Else if the packet is of low class AND policer result=Red, then consider this as T−H≤0 in FIG. 2 and discard the packet.

As described earlier, other combinations are possible:
VAR 1: Guaranteeing resources to low class packets could be done by setting EIR>0. For example, CIR=0.9 T and EIR=0.1 T could implement L'=0.1 T of the dashed blocks of FIG. 1.
VAR 2: Multi-class (e.g., classes 0-7) support could be implemented by configuring multiple policers.
VAR 4: Other packet types can be used. For example the CIR may be assigned only to high-class AND high-precedence packets. In this case, the switch will submit a packet to the policer as Green only when it is both high class and high precedence, rather than high class alone.
The diagram shown in FIG. 2 assumes no hysteresis on the ingress buffer fill level, however such hysteresis can be added if desired.

It should be appreciated that other versions of the method and other embodiments of the switch may be proposed, and that they should be considered part of the invention as far as defined by the claims which follow.

The invention claimed is:

1. A method for selective admission of traffic packets to a telecommunication switch, the method comprising:
   storing, in a common input queue, a first plurality of high class packets received at a first rate and a second plurality of low class packets received at a second rate;
   determining whether the switch operates under a stress state based on a congestion at the common input queue and on a throughput of the switch;
   delaying transfer of a first part of the second plurality of low class packets to a next processing block in case the switch is determined to operate under the stress state;
   based on the throughput of the switch and the first rate of the first plurality of high class packets, calculating an instantaneous leftover throughput; transferring all of the first plurality of high class packets from the common input queue to the next processing block; and
   transferring a second part of the second plurality of low class packets from the common input queue to the next processing block on a basis of the instantaneous leftover throughput,
   wherein a maximum admission rate L of the second plurality of low class packets is: $L=T'-\alpha*H$, and wherein:
   H is an instantaneous rate of high class packets recently admitted by the switch;
   $\alpha$ is a coefficient having a value of $0<\alpha\leq 1$;

T' is a pre-defined limit of the switch throughout wherein T'≤T; and T is the switch throughput.

2. The method according to claim 1, wherein the step of calculating the instantaneous leftover throughput is further based upon a processing power required to discard a low class packet.

3. The method according to claim 1, further comprising determining a state of the common input queue also based on its fill level, wherein if the fill level is above a predetermined threshold the common input queue is considered to be under the stress state, otherwise the common input queue is considered to be under a normal state.

4. The method according to claim 1, further comprising reserving a predetermined part of the throughput of the switch to one or more low class packets of the second plurality of low class packets.

5. The method according to claim 1, further comprising:
   storing, at the common input queue, a third plurality of packets; and
   transferring at least a part of the third plurality of packets to the next processing block only when all the packets from the first plurality of high class packets and all the packets from the second plurality of low class packets have been transferred to the next processing block.

6. A software product comprising computer implementable instructions stored on non-transitory computer readable storage medium, wherein the instructions carrying out the method of claim 1, executed in a switch controller, the method of claim 1 is performed.

7. A telecommunication switch configured enable selective admission of traffic packets, the switch comprising:
   an ingress buffer configured to store, in a common input queue, a first plurality of high class packets received at a first rate and a second plurality of low class packets received at a second rate; and
   at least one controller configured to:
   determine based on a congestion at the common input queue and a throughput of the switch, whether the switch operates under a stress state;
   in case the switch is determined to operate under a stress state, delay transfer of a first part of the second plurality of low class packets to a next processing block;
   calculate, based on the throughput of the switch and the first rate of the first plurality of high class packets, an instantaneous leftover throughput;
   transfer all the first plurality of high class packets from the common input queue to the next processing block; and
   transfer a second part of the second plurality of low class packets from the common input queue to the next processing block on a basis of the instantaneous leftover throughput;
   wherein a maximum admission rate L of the second plurality of low class packets is: $L=T'-\alpha*H$, and wherein:
   H is an instantaneous rate of high class packets recently admitted by the switch;
   $\alpha$ is a coefficient having a value of $0<\alpha\leq 1$;
   T' is a pre-defined limit of the switch throughput wherein T'≤T; and T is the switch throughput.

8. The switch according to claim 7, wherein the calculation of the instantaneous leftover throughput is further based upon a processing power required to discard a low class packet.

9. The switch according to claim 7, wherein the first part of packets from the second plurality of low class packets whose transfer to a next processing block was delayed are discarded.

10. The switch according to claim 7, wherein the first part of packets of the second plurality of low class packets are stored at a different queue.

\* \* \* \* \*